United States Patent [19]
Jones et al.

[11] Patent Number: 6,061,752
[45] Date of Patent: May 9, 2000

[54] TECHNIQUE FOR HOT PLUGGING A PERIPHERAL CONTROLLER CARD CONTAINING PCI AND SCSI BUSES ON A SINGLE CONNECTOR INTO A HOST SYSTEM BOARD

[75] Inventors: Bryan A. Jones, Houston; Michael L. Sabotta, Cypress; Thomas W. Grieff, Spring, all of Tex.

[73] Assignee: Compaq Computer Corporation, Houston, Tex.

[21] Appl. No.: 09/097,493

[22] Filed: Jun. 15, 1998

Related U.S. Application Data

[63] Continuation-in-part of application No. 08/876,730, Jun. 16, 1997, Pat. No. 5,986,880.

[51] Int. Cl.[7] ..................................................... G06F 13/00
[52] U.S. Cl. .......................... 710/103; 710/128; 710/129
[58] Field of Search ..................................... 710/100–103, 710/126–130, 2

[56] References Cited

U.S. PATENT DOCUMENTS

| | | | |
|---|---|---|---|
| 5,581,712 | 12/1996 | Herrman | 710/103 |
| 5,726,506 | 3/1998 | Wood | 307/147 |
| 5,793,987 | 8/1998 | Quackenbush et al. | 710/100 |

*Primary Examiner*—Ayaz R. Sheikh
*Assistant Examiner*—Sumati Lefkowitz
*Attorney, Agent, or Firm*—Akin, Gump, Strauss, Hauer & Feld, LLP

[57] ABSTRACT

An embodiment of the present invention discloses a technique that allows hot plugging a peripheral controller card, containing both a local bus and a peripheral bus on a single connector, into a host system board containing a host system bus and a host I/O bus. When mating the peripheral controller card to the host system board a local device power supply (LDPS) is inactive, a peripheral device power bus (PDPB) is powered, and signal lines of a peripheral device are maintained in a high impedance state. Following a delay after the mating, the LDPS is activated by the host operating system (OS). Following the activation of the LDPS, the host system bus is coupled to the single connector through switches that are under OS control. In response to the activation of the LDPS, the signal lines of the peripheral device are enabled.

In a disclosed embodiment the peripheral controller card is a disk array controller card, the local bus is a PCI bus, and the peripheral bus is a SCSI bus. In one embodiment the disk array controller card is coupled to a mass storage peripheral and in another embodiment is programmed for RAID. An advantage of an embodiment of the present invention is that a PCI bus and a SCSI bus are carried on a single peripheral connector which provides cable management and readily allows hot plugging a redundant peripheral controller card into the host system board.

28 Claims, 3 Drawing Sheets

TECHNIQUE FOR HOT PLUGGING A PERIPHERAL CONTROLLER CARD CONTAINING PCI AND SCSI BUSES ON A SINGLE CONNECTOR INTO A HOST SYSTEM BOARD

CROSS-REFERENCE TO RELATED APPLICATIONS

This application is a continuation-in-part of U.S. application Ser. No. 08/876,730 filed Jun. 16, 1997, U.S. Pat. No. 5,986,880 which is hereby incorporated by reference.

STATEMENT REGARDING FEDERALLY SPONSORED RESEARCH

Not applicable.

BACKGROUND OF THE INVENTION

1. Field of the Invention

This invention relates to peripherals controllers and more specifically to a technique for hot plugging a disk array controller card that combines PCI and SCSI buses on a single connector.

2. Description of the Related Art

Servers are critical components of a computer network as their efficiency and reliability directly impact the efficiency and reliability of the computer network as a whole. Servers have typically been utilized to provide access to shared printers and files. As a general rule, a computer network has multiple file servers which have traditionally been used as storage hubs for various files. In a typical application, a copy of a stored file is transferred to a client on demand with an updated file being returned to the server for storage. As a result of on-demand file transfer, any delay in accessing files on a disk subsystem directly affects the efficiency of the network.

The requirement for high performance efficient networks has led to advances in disk drives and in disk subsystem architectures. Disk drive storage sizes have increased, access times have decreased, and data transfer rates have increased. However, while disk drive technology has advanced, processing capabilities of personal computers and workstations have also advanced. As more clients are added to a given network and the processing capability of those clients increase, there is a continuing push to minimize the downtime (increase the reliability) of disk subsystems servicing that network.

In response to the need for reliable inexpensive disk drive subsystems, redundant array of inexpensive disks (RAID) configurations have been developed. RAID implementations can provide error detection and duplicate storage of information on a disk drive subsystem in the event one or more disk drives in the disk drive subsystem fail. Some of the advantages provided by RAID subsystems have been higher data transfer rates, increased disk capacity, higher input/output (I/O) rates, and faster data access. Depending upon which level of RAID was implemented, disk striping, mirroring, parity checking, or some combination was employed. For example, RAID level 4 implements block interleaved data striping with parity checking, with parity information being stored on a single disk drive. In contrast, RAID level 5 strips both data and parity information across multiple disk drives. These RAID implementations and others are well known to those of ordinary skill in the art.

In an effort to minimize down-time of subsystems servicing a computer network, and in turn the network, hot plugging techniques were developed. A requirement of hot plugging a given peripheral controller card into a computer system is that the mating operation not disturb a host system bus. The ability to hot plug a peripheral controller card into a computer system is highly desirable in computer systems that require continuous operation. File servers are a typical example of computer systems that can benefit from hot plugging since they require virtually continuous operation in providing client access to files. Another technique for minimizing a file server's downtime and increasing the file server's reliability has been to utilize redundant disk array controller cards. In a typical file server, a redundant disk array controller card provides a back-up that can assume control of related disk subsystems should an associated disk array controller card fail.

SUMMARY OF THE INVENTION

An embodiment of the present invention discloses a technique that allows hot plugging a redundant peripheral controller card, containing both a local bus and a peripheral bus on a single connector, into a host system board containing a host system bus and a host I/O bus. When mating the redundant peripheral controller card to the host system board a local device power supply (LDPS) is inactive, a peripheral device power bus (PDPB) is powered, and signal lines of a peripheral device are maintained in a high impedance state. The signal lines of the peripheral device are maintained in the high impedance state so that communications of an associated peripheral controller card are not interrupted when the redundant peripheral controller card is hot plugged. Following a delay after the mating, the LDPS is activated by the host operating system. Following the activation of the LDPS, the host system bus is coupled to the single connector through switches that are under operating system (OS) control. In response to the activation of the LDPS, the signal lines of the peripheral device are enabled.

In a disclosed embodiment the peripheral controller card is a disk array controller card, the local bus is a peripheral component interconnect (PCI) bus, and the peripheral bus is a small computer system interface (SCSI) bus. In that embodiment the disk array controller card is coupled to a mass storage peripheral and which can be programmed for RAID. The present invention provides the disk array controller card with a PCI bus and a SCSI bus on a single connector which allows a redundant disk array controller card to be more readily hot plugged into the host system board. An advantage of the present invention is that it provides for better cable management and allows for the use of redundant disk array controller cards, which can increase a server's reliability.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

The following disclosures are hereby incorporated by reference:

U.S. application Ser. No. 09/097,409, entitled "PROVIDING TWO DIFFERENT MESSAGING UNITS ON A SINGLE PERIPHERAL CONTROLLER", by Thomas W. Grieff, Bryan A. Jones, and Michael L. Sabotta, filed concurrently herewith; and U.S. application Ser. No. 09/097,408, entitled "HIDING PERIPHERAL MEMORY TRANSACTIONS ON A LOCAL BUS WITHIN A PERIPHERAL CONTROLLER FROM A HOST SYSTEM BUS", by Michael L. Sabotta, Bryan A. Jones, and Thomas W. Grieff, filed concurrently herewith.

COMPUTER SYSTEM OVERVIEW

Figure 1:
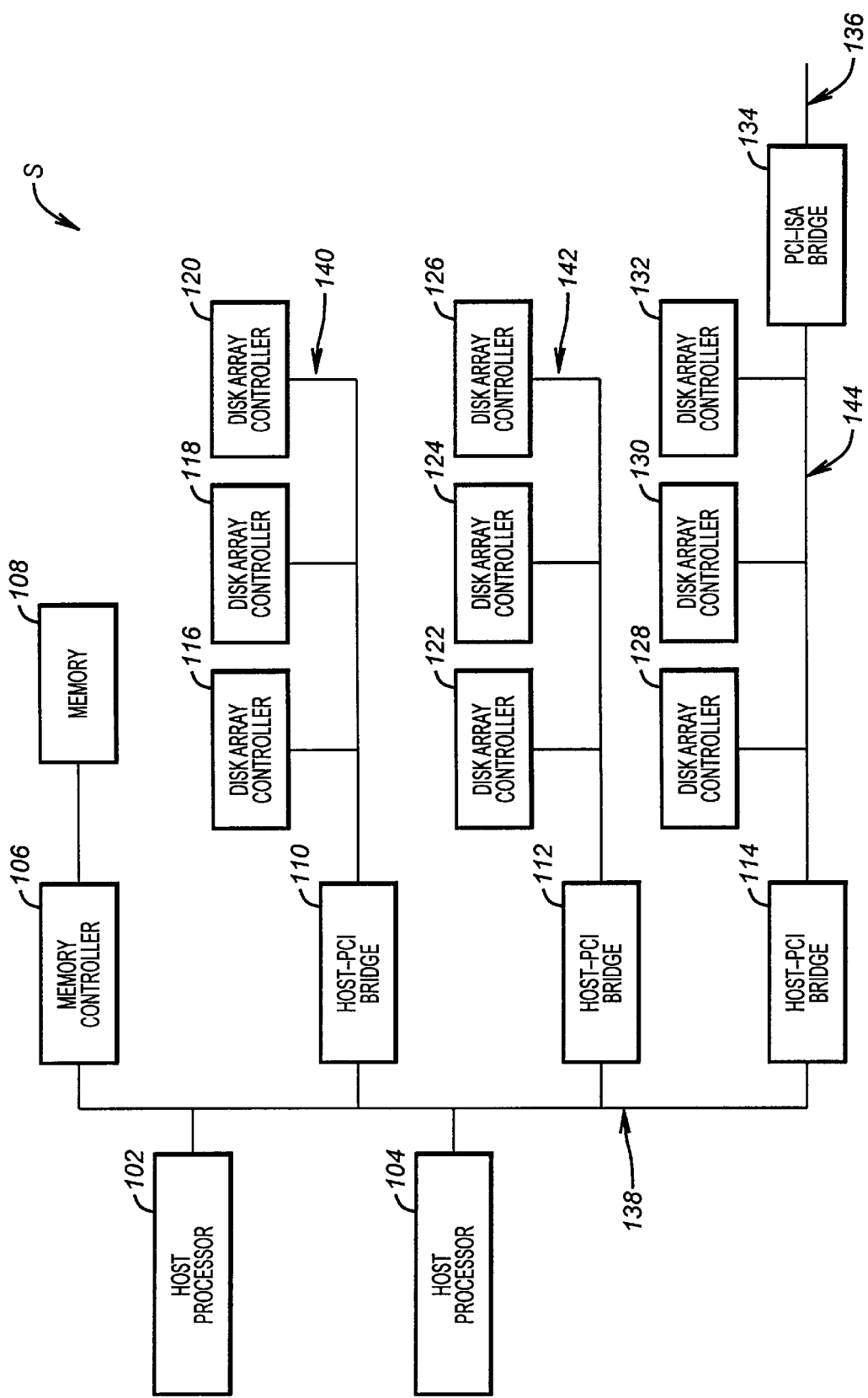
FIG. 1 is a block diagram of a computer system S that implements hot plugging of redundant peripheral controller cards according to an embodiment of the present invention.

Turning to FIG. 1, illustrated is a typical computer system S implemented according to the invention. While the system S is illustrative of one embodiment, the techniques according to the invention can be implemented in a wide variety of systems. In the preferred embodiment the computer system S is a server for controlling a mass storage peripheral. The computer system S in the illustrated embodiment is a peripheral component interconnect (PCI) bus/industry standard architecture (ISA) bus based machine, having multiple PCI buses 140, 142, and 144 and an ISA bus 136. The multiple PCI buses 140–144 are controlled by PCI controller circuitry located within a corresponding host-PCI bridge 110, 112, or 114. The host-PCI bridges 110–114 couple the corresponding PCI buses 140–144 to host processors 102 and 104 via a host bus 138 and to a memory controller 106. The memory controller 106 controls host memory 108. A PCI-ISA bridge 134 connects the PCI bus 144 and the ISA bus 136.

The host bridges 110–114 can be 440LX integrated circuits manufactured by Intel Corporation. The ISA bridge 134 can be a PIIX4, also manufactured by the Intel Corporation. The host bridges 110–114 and the ISA bridge 134 provide capabilities other than bridging between the processors 102 and 104 and the PCI buses 140–144, and the PCI bus 144 and the ISA bus 136. Specifically, the disclosed host bridges 110–114 include interface circuitry that couples the host bus 138 to the appropriate PCI bus 140–144.

The host bridges 110–114 are preferably coupled to the host processors 102 and 104, which can be Pentium Pro processors. The Pentium Pro processors 102 and 104 could be replaced with different processors other than the Pentium Pro without detracting from the spirit of the invention. The processors 102 and 104 are capable of running any of a number of operating systems, such as Windows®, Windows NT®, or a Unix based operating system. In the disclosed embodiment of the present invention, the processors 102 and 104 run Windows NT 5.0®.

The host bridges 110–114, when the Intel 440LX is employed as the host bridge, supports extended data out (EDO) dynamic random access memory (DRAM) and synchronous DRAM (SDRAM), a sixty four/seventy two bit data path memory, a memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridges 110–114 can support up to sixty (sixty megahertz) DRAMs.

The ISA bridge 134, when the PIIX4 is employed as the ISA bridge, also includes enhanced power management. It supports the PCI bus 144 at thirty or thirty-three megahertz and the ISA bus 136 at one-fourth of the PCI bus frequency. PCI revision 2.1 is supported with both positive and subtractive decoding. The standard personal computer input/output (I/O) functions are supported, including a direct memory access (DMA) controller, two 82C59 interrupt controllers, an 8254 timer, a real time clock (RTC) with a two hundred fifty six byte complementary metal oxide semiconductor (CMOS) static random access memory (SRAM), and chip selects for system read only memory (ROM), keyboard controller, an external microcontroller, and two general purpose devices. The enhanced power management within the ISA bridge 134 includes full clock control, device management, suspend and resume logic, advanced configuration and power interface (ACPI), and system management bus (SMBus) control, which implement the inter-integrated circuit ($I^2C$) protocol.

Each of the PCI buses 140–144 can couple a variety of devices that generally take advantage of a high speed data path. In the disclosed embodiment a maximum of three disk array controller cards can be coupled to each of the PCI buses 140–144. In the preferred embodiment, each disk array controller card 116, 118, 120, 122, 124, 126, 128, 130, and 132 is programmed as a RAID controller.

Again, it should be understood that a wide variety of systems could be used instead of the disclosed system S without detracting from the spirit of the invention. Further, other current and future operating systems could be utilized as well. In addition, the disk array controller cards 116–132 could potentially control various mass storage peripherals which include: tape drives, WORM, CD-ROM, and optical storage devices.

HOT PLUGGING OVERVIEW

Figure 2:
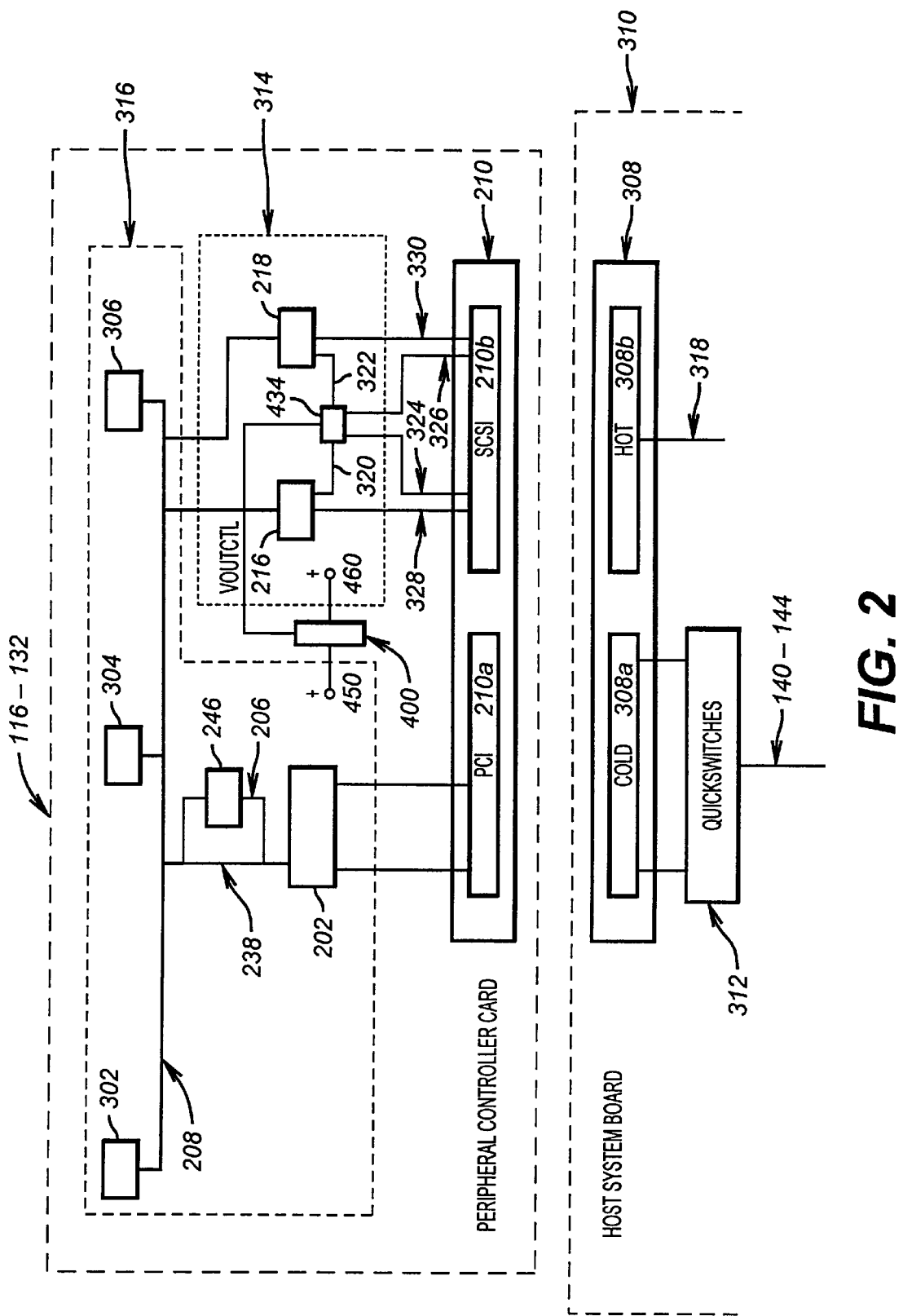
FIG. 2 is a block diagram illustrating which components of a redundant disk array controller card are initially powered when the redundant disk array controller card is hot plugged into the host system board according to an embodiment of the present invention.

Turning to FIG. 2, shown is a block diagram illustrating which components of the disk array controller cards 116–132 are initially powered when one of the disk array controller cards 116–132 is hot plugged into a host system board 310. For discussion purposes connector 210 and connector 308 are shown as being divided into two sections 'a' and 'b'. The disk array controller card 116–132 is coupled to the host system board 310 through the mating of the connectors 210 and 308. The host system bus 140–144 is coupled to a PCI portion 308a of the connector 308 through switches 312. In the preferred embodiment, the switches 312 are manufactured by Quality Semiconductor and are QuickSwitch® products. The switches 312 are under the control of the operating system (OS) and are initially open when the disk array controller card 116–132 is mated with the host system board 310.

A local device power supply (LDPS) 450 provides power to cold mated components 316, which are local devices. The LDPS 450 is routed to the disk array controller card 116–132 from the host system board 310 via the connector 308. The cold mated components 316 are initially, upon mating of the connectors 308 and 210, without power. The cold mated components 316 include: a PCI-PCI bridge 202, recode logic 246, first messaging unit (FMU) related circuitry 302, memory controller related circuitry 304, and second messaging unit (SMU) related circuitry 306. The OS detects when the disk array controller card 116–132 is hot plugged into the host system board 310 and, after an appropriate period, causes the LDPS 450 to be activated. Following the activation of the LDPS 450 the OS enables the switches 312 which in turn couple the host system bus 140–144 to the local bus 208. As previously stated, the LDPS 450, when active, provides power to the cold mated components 316.

A host I/O bus 318 is routed on the host system board 310 and is coupled to the disk array controller card 116–132 through the connector 308. In the preferred embodiment the host I/O bus 318 is, in fact, a small computer system interface (SCSI) bus with four separate SCSI channels. One channel of the SCSI bus is routed between redundant disk array controller cards. This SCSI channel provides an inter-controller communication link. Also coupled to the local bus 208 are SCSI controllers 216 and 218. Each of the SCSI controllers 216 and 218 present one load to the local bus 208. In the preferred embodiment the SCSI controllers 216 and 218 are PCI dual channel SCSI multi-function controllers (part number SYM53C876) manufactured by Symbios Logic.

A first channel of the SCSI controller 216 is coupled to the connector 210. A second channel of the SCSI controller 216 is coupled to a terminator 220. The output of the terminator 220 is coupled to the connector 210. The second channel of the SCSI controller 216 serves as the inter-controller communication link allowing a disk array controller card to communicate with an associated redundant disk array controller card. In this manner, the second channel of the SCSI controller provides for point-to-point communication between associated disk array controller cards.

Using the second channel of the SCSI controller 216 as the inter-controller communication link allows SCSI controller's 216 on different disk array controller cards 116–132 to communicate. For example, when the OS requires a disk array controller card to write to its battery-backed memory 214; the write must occur on the disk array controller card and on the associated redundant disk array controller card before the OS is notified that the write is complete. Through the inter-controller communication link redundant disk array controllers can notify each other that a write is posted. Thus, the OS is only informed that a write is posted when both of the disk array controller cards have completed the write. This provides write cache coherency.

Both first and second channels of the SCSI controller 218 are coupled to the connector 210. In addition to coupling the local bus 208 of one of the disk array controller cards 116–132 to the host system bus 140–144 by way of the PCI-PCI bridge 202, the connector 210 serves to couple the first channel of the SCSI controller 216 and both of the channels of SCSI controller 218 to the SCSI disk arrays (not shown).

In the disclosed embodiment, the host I/O bus 318 is coupled to a SCSI bus when the connectors 210 and 308 are mated. When the connectors 210 and 308 are mated, power and ground pins are preferably pre-mated. Upon completion of the pre-mating process various PCI and SCSI signal pins are mated. This pre-mating is accomplished by requiring that the power and ground pins are longer than the PCI and SCSI signal pins. As previously discussed, the host system buses 140–144 are not initially connected to the local bus 208 of the disk array controller card 116–132 when connectors 210 and 308 are mated. This is because the host system buses 140–144 are coupled to the connector 308 through the switches 312. As previously stated, the switches 312 are under OS control and are enabled after the LDPS 450 is activated.

Hot mated components 314 are initially, upon mating of the connectors 308 and 210, powered. The initial power for the hot mated components 314 is supplied to a peripheral device power bus (PDPB) 460. The PDPB 460 initially provides 3.3 volt power to the hot mated components 314. The PDPB 460 is coupled to a 3.3 volt power supply through a programmable hot swap power manager (PHSPM) 462 (see FIG. 3). The 3.3 volt power supply is a peripheral device power supply (PDPS) 470. While the SCSI controllers 216 and 218 are 5 volt devices, utilizing the PDPS 470 in this manner allows for compatibility with next generation 3.3 volt SCSI controllers. In the preferred embodiment, the PHSPM 462 is manufactured by Unitrode Corporation (part number UCC3912). The PHSPM 462 is designed for uni-directional current flow and functions as an ideal diode in series with a switch. When the PDPB 460 is pulled to 5 volts the PDPS 470 is disconnected from the PDPB 460 via the PHSPM 462. This occurs after the LDPS 450 is activated.

The hot mated components 314 include the SCSI controllers 216 and 218, both of which are peripheral devices. Reset line multiplexing (RLM) circuitry 434 is also powered by the PDPB 460 (see FIG. 4). For simplicity, only one channel of each of the SCSI controllers 216 and 218 is illustrated as being coupled to the connector 210. Upon initial power-up the SCSI controllers 216 and 218 maintain their signal lines in a high impedance state. As previously discussed, this is important because a SCSI controller 216 and 218 of the disk array controller card could be communicating with a mass storage peripheral when the associated redundant disk array controller card is hot plugged.

The SCSI signal lines 328 and 330 are maintained in the tri-state condition by the RLM circuitry 434 (see FIG. 4), which is controlled by a VOUTCTL signal. The VOUTCTL signal is provided by sense/connection (S/C) circuitry 400 (see FIG. 3). The RLM circuitry 434 and the S/C circuitry 400 are discussed further below. The SCSI signal lines 328 and 330 are maintained in the high impedance state until the LDPS 450 (the power supply for the cold mated components 316) is activated and reaches a designed voltage level. When this occurs, the SCSI reset lines 320 and 322 of the SCSI controllers 216 and 218 are coupled to the connector 210 via signal lines 324 and 326. Once the SCSI reset lines 320 and 322 are taken low and then high the SCSI signal lines 328 and 330 are no longer tri-stated.

The S/C circuitry 400, which is coupled between the LDPS 450 and the PDPB 460, senses when the LDPS 450 reaches the designed voltage level. When the LDPS 450 reaches the designed voltage level the S/C circuitry 400 connects the LDPS 450 and PDPB 460 through a low impedance connection provided by field-effect transistors (FETs) 414, 416, 418, and 420 (see FIG. 3). This causes the PHSPM 462 to disconnect the PDPB 460 from the PDPS 470. As previously stated, the S/C circuitry 400 also provides the VOUTCTL signal to the RLM circuitry 434. The S/C circuitry 400 is discussed in more detail below. The RLM circuitry 434 couples SCSI reset lines 320 and 322 to the PDPB 460. If the SCSI reset lines 320 and 322 come up with the PDPB 460 the SCSI signal lines 328 and 330 will tri-state and remain in the high impedance state until the SCSI reset lines 320 and 322 are taken low and then high.

When the SCSI reset lines 320 and 322 are taken low and then high all of the SCSI peripherals connected to the SCSI bus 318 are reset. At that point, the SCSI signal lines 328 and 330 are no longer in the high impedance state. As discussed previously, this occurs after the LDPS 450 has been activated and reached the designed voltage level (in this case approximately 5 volts). At that point the RLM circuitry 434 couples the SCSI reset lines 320 and 322 to the connector 210 via signal lines 324 and 326.

Figure 3:
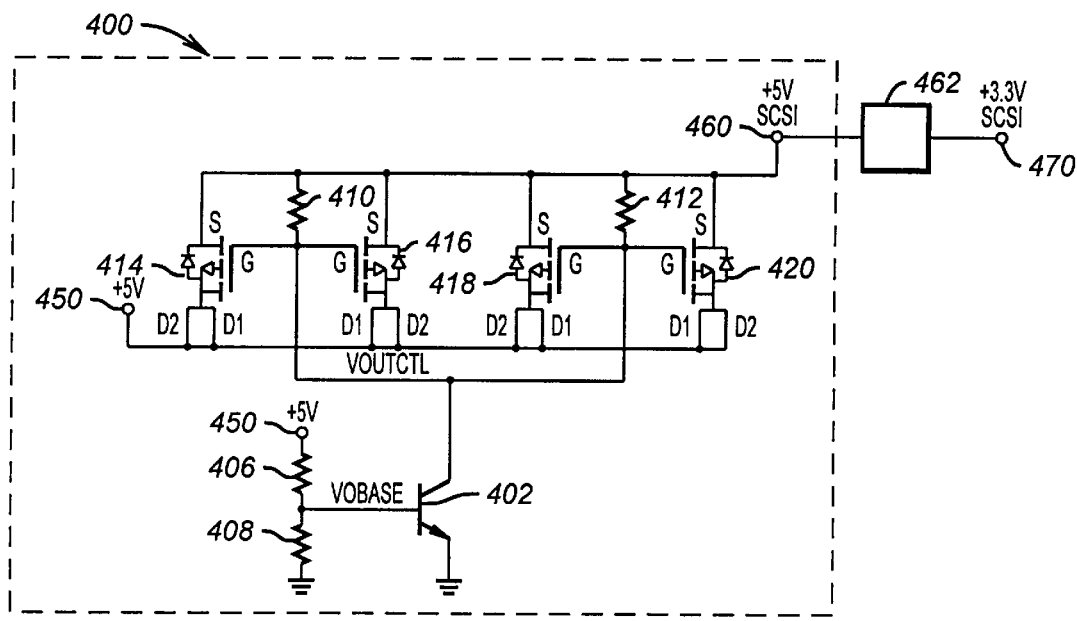
FIG. 3 is a schematic diagram illustrating sense/connection circuitry according to an embodiment of the present invention.

Moving to FIG. 3, the circuitry which detects when the LDPS 450 has reached the designed voltage level is illustrated. When powered a NPN transistor 402 is biased by resistors 406 and 408. When the LDPS 450 is inactive, the transistor 402 is off. When the LDPS 450 reaches the designed voltage level (set by the resistors 406 and 408) the transistor 402 turns on. When this occurs, a gate of FETs 414–420 is pulled low (approximately to ground). Pulling the gate of FETs 414–420 low causes the FETs 414–420 to turn on. When the FETs 414–420 turn on, power buses of the PDPB 460 and the LDPS 450 are connected. Resistors 410 and 412 serve to pull the VOUTCTL signal high when the transistor 402 is off. When the transistor 402 is on, the resistors 410 and 412 limit the current flow through the transistor 402.

Figure 4:
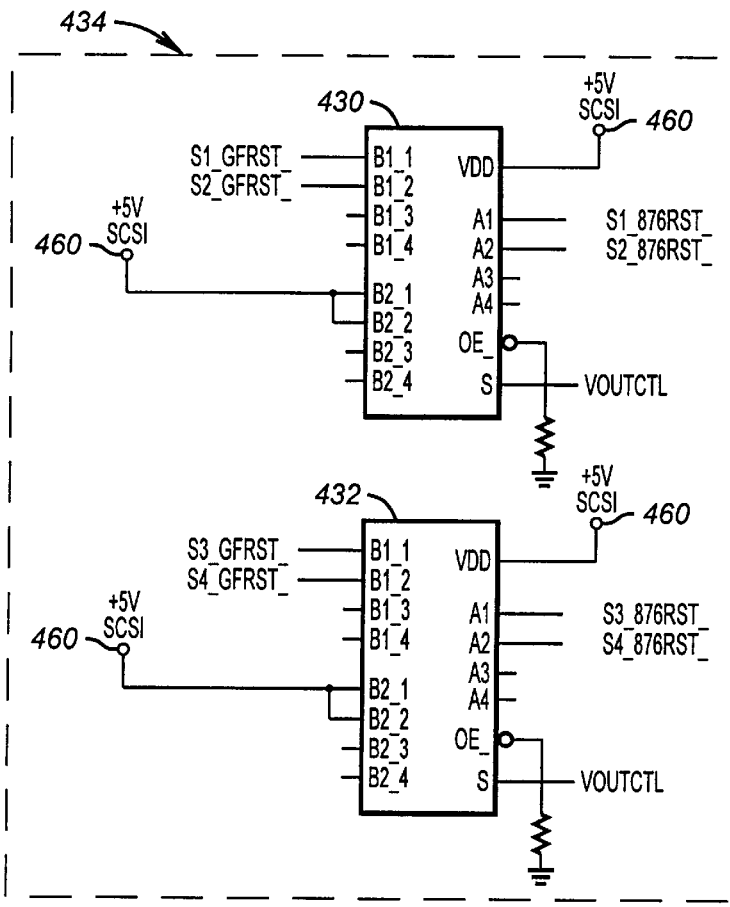
FIG. 4 is a schematic diagram illustrating reset line multiplexing circuitry according to an embodiment of the present invention.

Turning to FIG. 4, illustrated is the RLM circuitry 434 which causes the SCSI signal lines 328 and 330 to remain in the high impedance state until the LDPS 450 reaches the designed voltage level. The SCSI reset line 320 (see FIG. 2) is representative of signals S1_876RST_ and S2_876RST_. The S1_876RST_ and S2_876RST_ signals are coupled to inputs of multiplexing switch 430. The SCSI reset line 330 is representative of signals S3_876RST_ and S4_876RST_. The S3_876RST_ and S4_876RST_ signals are coupled to inputs of multiplexing switch 432. In the preferred embodiment, the multiplexing switches 430 and 432 are manufactured by Quality Semiconductor and are QuickSwitch® products (part number QS3257). Signal lines 324 and 326 are representative of signals S1_GFRST_, S2_GFRST_, S3_GFRST_, and S4_GFRST_. S1_GFRST_, S2_GFRST_, S3_GFRST_, and S4_GFRST_ are likewise coupled to the connector 210. The VOUTCTL signal dictates whether the SCSI reset lines 320 and 322 are coupled to the PDPB 460 or the connector 210. When the VOUTCTL signal is pulled high the SCSI reset lines 320 and 322 are coupled to the PDPB 460.

The VOUTCTL signal is high when the transistor 402 is off. The transistor 402 being off indicates that the LDPS 450 is inactive. When the VOUTCTL signal is low the SCSI reset line 320 and 322 are coupled to the connector 210 via signal lines 324 and 326. The VOUTCTL signal is low when the transistor 402 is on. Using this technique the SCSI signal lines 328 and 330 are held in the high impedance state until the LDPS 450 is active and has attained the designed voltage level. This prevents the hot plugging of a disk array controller card from interfering with communications of an associated redundant disk array controller card.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of hot plugging a peripheral controller card into a host system board using a single connector, the single connector coupling a local bus and a peripheral bus of the peripheral controller card to a host system bus and a host I/O bus of the host system board, the single connector also providing a local device power supply and a peripheral device power supply to the peripheral controller card, the local device power supply providing power to local devices coupled to the local bus, the peripheral device power supply providing power to a peripheral device coupled to both the local bus and the peripheral bus, the method comprising the steps of:

mating the local bus with the host system bus and the peripheral bus with the host I/O bus, wherein the local device power supply is inactive, the peripheral device power supply is active, and signal lines of the peripheral device are maintained in a high impedance state;

activating the local device power supply; and enabling the signal lines of the peripheral device in response to the activation of the local device power supply.

2. The method of claim 1, wherein the mating step further comprises:

pre-mating power and ground pins of the local device power supply and the peripheral device power supply; and mating the local bus with the host system bus and the peripheral bus with the host I/O bus after the pre-mating step.

3. The method of claim 1, wherein the local device power supply is activated by a host operating system after a predetermined time interval.

4. The method of claim 1, wherein the host system bus is coupled to the single connector through switches located on the host system board, the switches being controlled by a host operating system.

5. The method of claim 1, wherein the signal lines of the peripheral device are maintained in the high impedance state by coupling a reset line of the peripheral device to the peripheral device power supply responsive to the local device power supply.

6. The method of claim 1, wherein the signal lines of the peripheral device are enabled and the reset line of the peripheral device is coupled to the single connector in response to the activation of the local device power supply.

7. The method of claim 1, wherein the peripheral controller is programmed for RAID.

8. The method of claim 1, wherein the peripheral controller is coupled to a mass storage peripheral.

9. The method of claim 1, wherein the local bus and the host system bus are PCI buses.

10. The method of claim 1, wherein the peripheral bus and the host I/O bus are SCSI buses.

11. A computer system capable of hot plugging a peripheral controller card, the computer system comprising:

a peripheral controller card, comprising:
      a local bus for communication with the host system board;
      a local device coupled to the local bus;
      a peripheral bus for communication with I/O devices;
      a peripheral device coupled to both the local bus and the peripheral bus; and
      a single connector;

a host system board including a peripheral connector to mate with the single connector of the peripheral controller card, the peripheral connector when mated with the single connector coupling the local bus and the peripheral bus of the peripheral controller card to a host system bus and a host I/O bus of the host system board, the peripheral connector when mated with the single connector also providing a local device power supply and a peripheral device power supply to the peripheral controller card, the local device power supply providing power to local devices coupled to the local bus of the peripheral controller card, the peripheral device power supply initially providing power to a peripheral device coupled to both the local bus and the peripheral bus of the peripheral controller card; and a processor coupled to the host system bus and the host I/O bus for communicating with the peripheral controller card, wherein upon mating of the peripheral controller card to the host system board the local device power supply is inactive, the peripheral device power supply is active, and the plurality of signal lines of the peripheral device of the peripheral controller card are maintained in a high impedance state.

12. The computer system of claim 11, wherein power and ground pins of the local device power supply and the peripheral device power supply are mated before pins of the local bus and the peripheral bus are mated with pins of the host system bus and the host I/O bus.

13. The computer system of claim 11, wherein the local device power supply is activated by a host operating system after a predetermined time interval.

14. The computer system of claim 11, wherein the host system bus is coupled to the peripheral connector through switches located on the host system board, and wherein the switches are controlled by a host operating system.

15. The computer system of claim 11, wherein the signal lines of the peripheral device are maintained in the high impedance state by coupling a reset line of the peripheral device to the peripheral device power supply responsive to the local device power supply.

16. The computer system of claim 11, wherein the signal lines of the peripheral device are enabled and a reset line of the peripheral device is coupled to the single connector in response to the activation of the local device power supply.

17. The computer system of claim 11, wherein the peripheral controller card is programmed for RAID.

18. The computer system of claim 11, wherein the peripheral controller card is coupled to a mass storage peripheral.

19. The computer system of claim 11, wherein the local bus and the host system bus are PCI buses.

20. The computer system of claim 11, wherein the peripheral bus and the host I/O bus are SCSI buses.

21. A peripheral controller card capable of being hot plugged into a host system board, the peripheral controller card comprising:

a local bus for communication with the host system board;

a local device coupled to the local bus;

a peripheral bus for communication with I/O devices;

a peripheral device coupled to both the local bus and the peripheral bus; and a single connector for mating with a peripheral connector of the host system board, the single connector coupling the local bus and the peripheral bus of the peripheral controller card to a host system bus and a host I/O bus of the host system board, the single connector when mated with the peripheral connector also providing power to a local device power supply and a peripheral device power supply to the peripheral controller card, the local device power supply providing power to the local device coupled to the local bus of the peripheral controller card, the peripheral device power supply initially providing power to a peripheral device coupled to both the local bus and the peripheral bus of the peripheral controller card, wherein upon mating of the peripheral controller card to the host system board the local device power supply is inactive, the peripheral device power supply is active, and signal lines of the peripheral device of the peripheral controller card are maintained in a high impedance state.

22. The peripheral controller card of claim 21, wherein power and ground pins of the local device power supply and the peripheral device power supply are mated before pins of the local bus and the peripheral bus are mated with pins of the host system bus and the host I/O bus.

23. The peripheral controller card of claim 21, wherein the signal lines of the peripheral device are maintained in the high impedance state by coupling a reset line of the peripheral device to the peripheral device power supply responsive to the local device power supply.

24. The peripheral controller card of claim 21, wherein the signal lines of the peripheral device are enabled and a reset line of the peripheral device is coupled to the single connector in response to the activation of the local device power supply.

25. The peripheral controller card of claim 21, wherein the peripheral controller card is programmed for RAID.

26. The peripheral controller card of claim 21, wherein the peripheral controller card is coupled to a mass storage peripheral.

27. The peripheral controller card of claim 21, wherein the local bus and the host system bus are PCI buses.

28. The peripheral controller card of claim 21, wherein the peripheral bus and the host I/O bus are SCSI buses.

* * * * *